(12) United States Patent
Kling et al.

(10) Patent No.: US 8,819,748 B2
(45) Date of Patent: Aug. 26, 2014

(54) PRECISE DELIVERING OF FRAMES FOR VIDEO ON DEMAND STREAMING

(75) Inventors: Lars-Örjan Kling, Södertälje (SE); Kjell Nyström, Trångsund (SE); Thomas Stig Johansson, Haninge (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 380 days.

(21) Appl. No.: 12/597,629

(22) PCT Filed: Apr. 25, 2008

(86) PCT No.: PCT/SE2008/050474
§ 371 (c)(1),
(2), (4) Date: Oct. 26, 2009

(87) PCT Pub. No.: WO2008/133589
PCT Pub. Date: Nov. 6, 2008

(65) Prior Publication Data
US 2010/0083332 A1    Apr. 1, 2010

Related U.S. Application Data

(60) Provisional application No. 60/914,146, filed on Apr. 26, 2007, provisional application No. 61/015,975, filed on Dec. 21, 2007.

(51) Int. Cl.
*H04N 7/173* (2011.01)
(52) U.S. Cl.
USPC ............................................. 725/91; 725/86

(58) Field of Classification Search
USPC ...................................................... 725/86, 91
See application file for complete search history.

(56) References Cited

U.S. PATENT DOCUMENTS

| | | | |
|---|---|---|---|
| 5,537,408 A | 7/1996 | Branstad et al. | |
| 5,640,597 A | 6/1997 | Noguchi et al. | |
| 5,844,890 A | 12/1998 | Delp et al. | |
| 6,052,375 A | 4/2000 | Bass et al. | |
| 6,802,074 B1 * | 10/2004 | Mitsui et al. | 725/25 |
| 6,901,206 B2 * | 5/2005 | DaSilva | 386/239 |
| 7,106,693 B1 * | 9/2006 | Turner et al. | 370/230 |
| 7,852,823 B2 * | 12/2010 | Nakashima et al. | 370/348 |
| 2002/0095460 A1 * | 7/2002 | Benson | 709/204 |
| 2003/0007785 A1 | 1/2003 | Shimizu | |

FOREIGN PATENT DOCUMENTS

JP    2005-311692 A    11/2005

* cited by examiner

*Primary Examiner* — Brian T Pendleton
*Assistant Examiner* — Olugbenga Idowu

(57) ABSTRACT

A method and a streaming server for timely delivering of frames/packets to a client. The method includes fetching of stream data from an operating cog in a calendar wheel and by use of the fetched stream data the frame/packet indicated in the operating cog is transmitted from its location in a video storage to the client. The stream data includes information on stream, movie and frame. Optionally also information on packet is provided.

11 Claims, 7 Drawing Sheets

PRECISE DELIVERING OF FRAMES FOR VIDEO ON DEMAND STREAMING

This application claims the benefit of U.S. Provisional Application No. 60/914,146, filed Apr. 26, 2007 and U.S. Provisional Application No. 61/015,975, filed Dec. 21, 2007, the disclosures of which are fully incorporated herein by reference.

TECHNICAL FIELD

The invention generally relates to delivering of frames from a video streaming server to Set Top Boxes, and more particularly to do a scheduling of the frames to be delivered timely.

BACKGROUND

A video streaming server is a device that is capable of streaming hundreds to thousands of video streams to Set Top Boxes at customer premises. The content itself may reside on CD's, conventional rotating disks, flash disks or even RAM. The most used storage today is conventional disks because of its low price per data volume.

Streaming video requires a precise timing regarding the point in time a specific frame is sent relative to the previous one. Further, it requires a precise timing regarding the point in time each packet belonging to that frame is sent. One frame contains one or several packets depending on the amount of data to be transmitted in the frame. If frames are not sent timely, the video buffer in the Set Top Box will either overflow or underflow. Further, if packets are not sent timely, the subscriber line, for instance ADSL, will be over-utilized thereby violating the service level agreement which would in most cases result in a packet loss.

Streaming in order of thousands of streams concurrently puts high demand on the scheduler who selects what frame or packet to send at a specific point in time.

Scheduling by using calendar wheels has been applied in a diverse of fields. For instance ATM scheduling is common practice.

According to prior art U.S. Pat. No. 6,477,168 Cell/frame scheduling method and communications cell/frame scheduler, Delp et al, there is described a method and apparatus for scheduling the transmission of cells and frames in a communications network. The transmission of cells and frames are scheduled utilizing a selected scheduling algorithm. The cell/frame scheduling algorithm includes the step of identifying a frame or cell transmission type. Responsive to the identified frame or cell transmission type, a frame multiplier value is identified and used to calculate a target transmission time. The main purpose is to have a scheduling with respect to quality and bandwidth. The patent does not discuss streaming hundreds or thousands of video streams to Set Top Boxes.

SUMMARY

An object of the invention is to manage streaming of hundreds of streams from a video streaming server to different Set Top Boxes, which is not handled in the prior art solutions. A further object of the invention is to handle different movies for different Set Top Boxes. According to the invention packets/frames are delivered precisely in time to clients.

These and other objects are met by the invention as defined by the accompanying claims.

The invention relates to a method in a Streaming Server for timely delivering of frames to a client, said method comprising the steps of; determining if there is stream data in an Operating element of a memory array comprising elements each representing a defined time period; fetching stream data, including information on stream, media identity and current frame, from the Operating element; getting the current frame from a Media Storage by using information related to media identity and current frame and sending the current frame to the client on the stream in fetched stream data.

The method further comprises the steps of Waiting the defined time period and then updating index for Operating element=Operating element+1.

The method may relate to a packet in a frame.

The sending step is further preceded by determining where the current frame is located and fetching the current frame from the location and storing the current frame in an output memory for delivery to the client.

The invention also comprises a Streaming Server for timely delivering of frames/packets from a Media Storage to clients. The Streaming Server includes a Calendar Wheel comprising Cogs representing a defined Cog time period which Cogs carry stream data information if a Frame/Packet is to be delivered to a client during the Cog time period. The Streaming Server also includes a Database with Frame/Packet Information for media to be delivered to clients, the Frame Information including Location Information for Frames/Packets and a Processor for controlling fetching/reading of Stream Data from the Calendar Wheel and controlling the fetching of the Frame/Packet from the Media Storage by use of the Location Information for Frames/Packets and the Streaming server also includes an Output connected with the Stream for delivery of the Frame/Packet to the client.

The Database may comprise information on the time when the Frame/Packet is to be delivered to the client.

The main advantage of the invention is the precise timing when a frame or packet is being transmitted to the client. Thus the video buffer filling rate will stay within appropriate levels without over- or underflow.

ABBREVIATIONS

STB—Set Top Box
RAM—Random Access Memory
CD—Compact Disc
ADSL—Asymmetric Digital Subscriber Line
ATM—Asynchronous Transfer Mode
VoD—Video on Demand
MPEG—Moving Pictures Expert Grout
DTS—Decode Time Stamp

SHORT DESCRIPTION OF THE DRAWINGS

The invention is understood by making reference to the following description taken together with the accompanying drawings, in which:

FIG. 1 is a simplified schematic overview of a communication system, to which the teachings of the invention can be applied.

FIG. 2*a* shows a rotating calendar wheel according to the invention.

FIG. 2*b* shows how events are being put in cogs in the wheel.

FIG. 2*c* shows how events are being put in the pipe which indicates that packets are sent.

FIG. 2*d* shows that the wheel continues to rotate.

DETAILED DESCRIPTION

Figure 1:
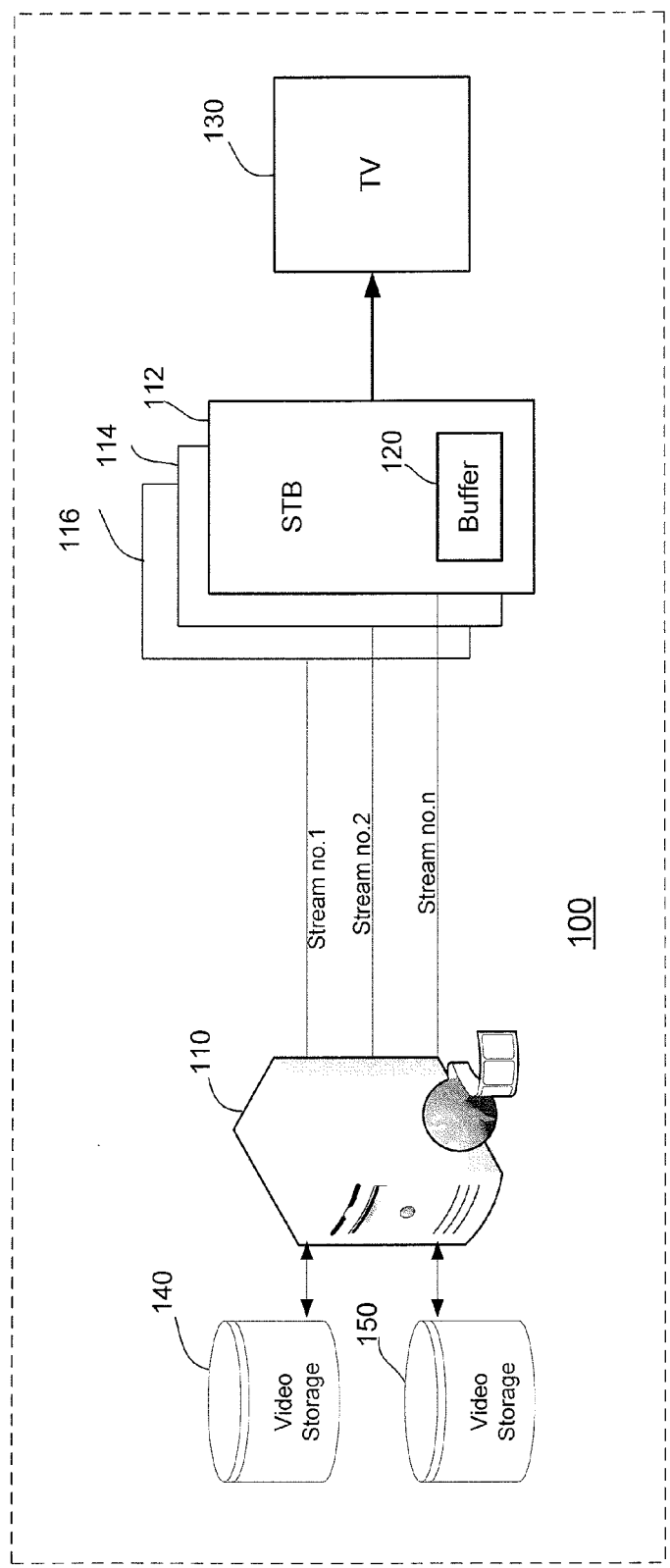

Throughout the drawings, the same reference characters will be used for corresponding or similar elements.

FIG. 1 relates to a communication system 100 including a Video on Demand VoD Streaming Server 110 for streaming of video content to clients which in this description are represented by Set Top Boxes 112, 114, 116. Each STB contains a buffer 120 where the stream is buffered initially before the information in the stream is decoded and delivered to a TV 130. A TV is also connected to the STB 114 and 116 which is not shown in FIG. 1. The Streaming Server 110 has the task of delivering frames timely and the task of the buffer 120 is to compensate for network delay. The content itself is stored at media storages 140, 150 which for example are conventional rotating disks. In the example the storages 140,150 are implemented as Video Storages. The network for delivering of the streams to STBs is not disclosed but in the FIG. 1 a number of streams 1-n are disclosed.

An MPEG video stream is built up of a sequence of contiguous frames which must be sent out with a time gap closely corresponding to the inverse of the frame rate. The frame rate is the number of pictures presented on a screen per second. Each frame in turn is build up of a sequence of packets which must be sent out with a time gap closely corresponding to the inverse of the maximum number of packets per second stated in a Service Level Agreement, SLA. In practice the SLA normally states the number of bytes per second, but since the number of bytes per packet is a known constant (typically about 1500) the figures can be derived from each other.

A typical frame rate is 25 frames per second with an inverse of 40 ms, which thus is the time gap to send out the frames. A typical packet rate is 400 packets per second with an inverse of 2.5 ms, which is the time gap to send out packets. Allowing for a maximum of 20% timing error between packets this result in a requirement on a precision of 0.2*2.5 ms=0.5 ms for packet scheduling. The 20% allowance of timing error means that the SLA must be 20% higher than the actual packet rate. In the near future high quality movies might demand even higher packet rates and hence an even better precision in packet scheduling. It is an object of the invention to meet the today and future demands on precision in packet delivering. According to an example in the description below the precision for packets are 0.5 ms.

In order to meet the requirements on precision in packet scheduling and delivering a so called calendar wheel is used. In FIGS. 2a, 2b, 2c and 2d this calendar wheel method is illustrated for the purpose of making the invention easy understandable.

Figure 2B:
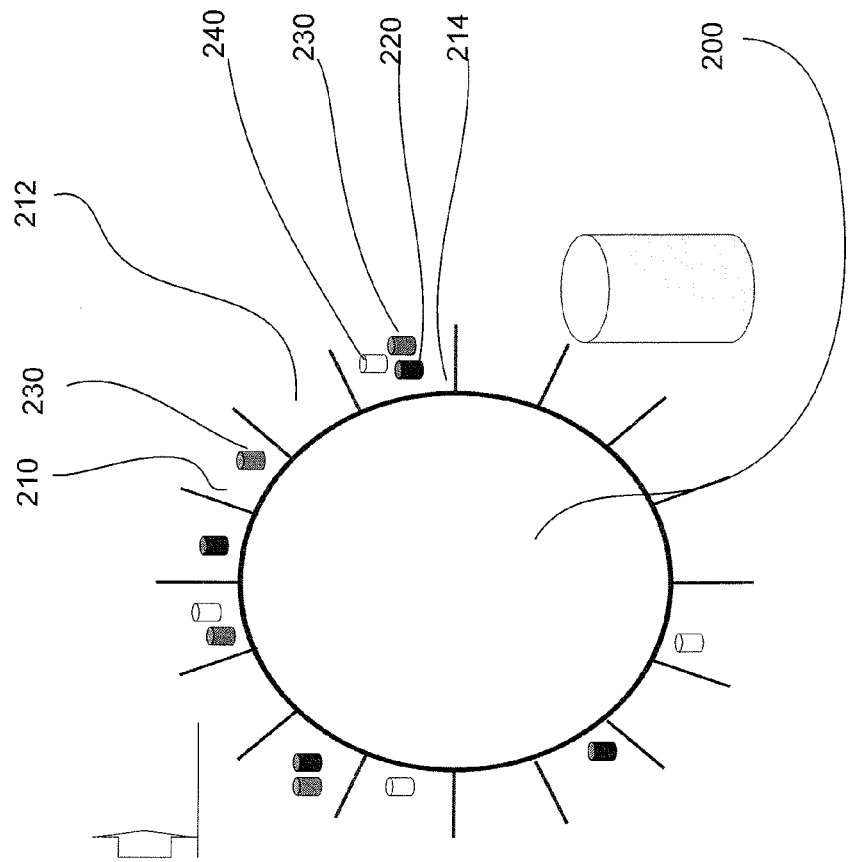
Figure 2A:
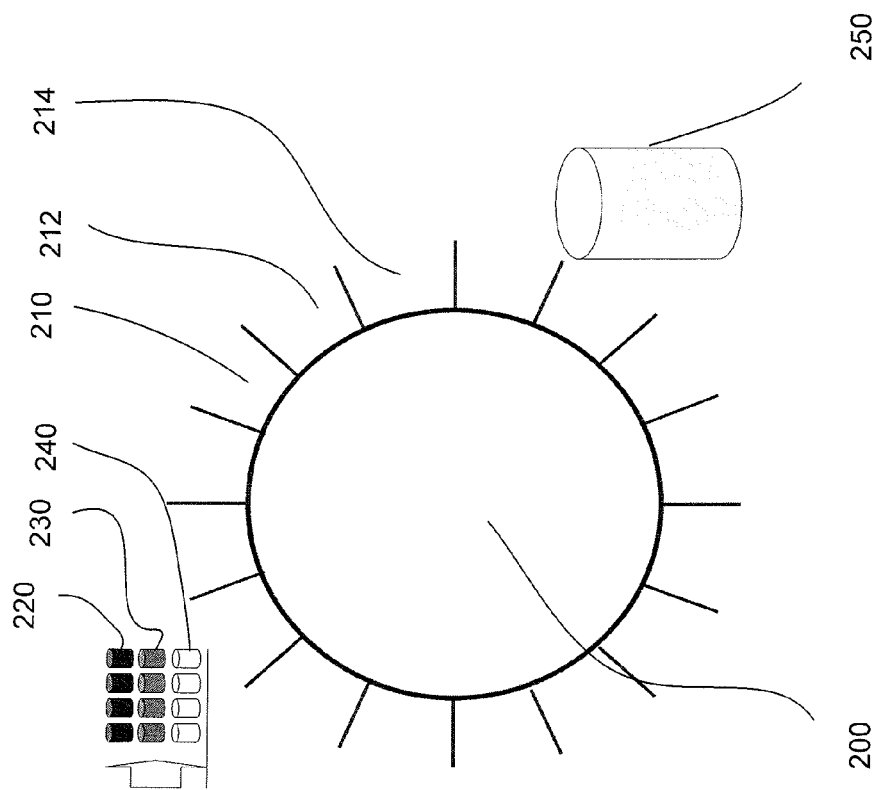

FIG. 2a shows a calendar wheel 200 which can be seen as a rotating "water" wheel consisting of a number of cogs 210, 212, 214. Each cog represents a specific range in absolute time. The size of the range corresponds to the precision in the timing of sending out packets. In our example, each cog would represent 0.5 ms as mentioned earlier. An event which in our example is the sending of a packet, is put in a cog representing the range in time when the event is supposed to happen. The wheel rotates at a constant speed when the time has been reached the event falls of the wheel. In the figure the calendar wheel 200 is empty. Incoming to the calendar wheel are packets from different video streams 220, 230, 240. A box 250 illustrates the sending of packets. In FIG. 2a the box is empty and no packets are sent.

FIG. 2b shows how events are being put in cogs in the calendar wheel 200. The events have been put into cogs corresponding to the time when they are supposed to happen. According to the FIG. 2b events from all three streams 220, 230, 240 have been put into the cog 214. In the next cog 212 no event is scheduled and as an example in cog 210 one event from the stream 230 is scheduled for sending of packets.

Figure 2D:
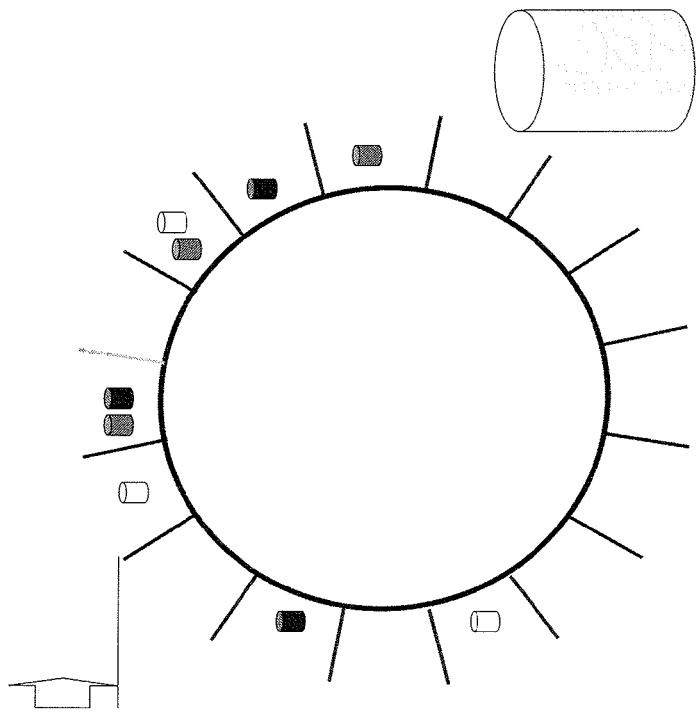
Figure 2C:
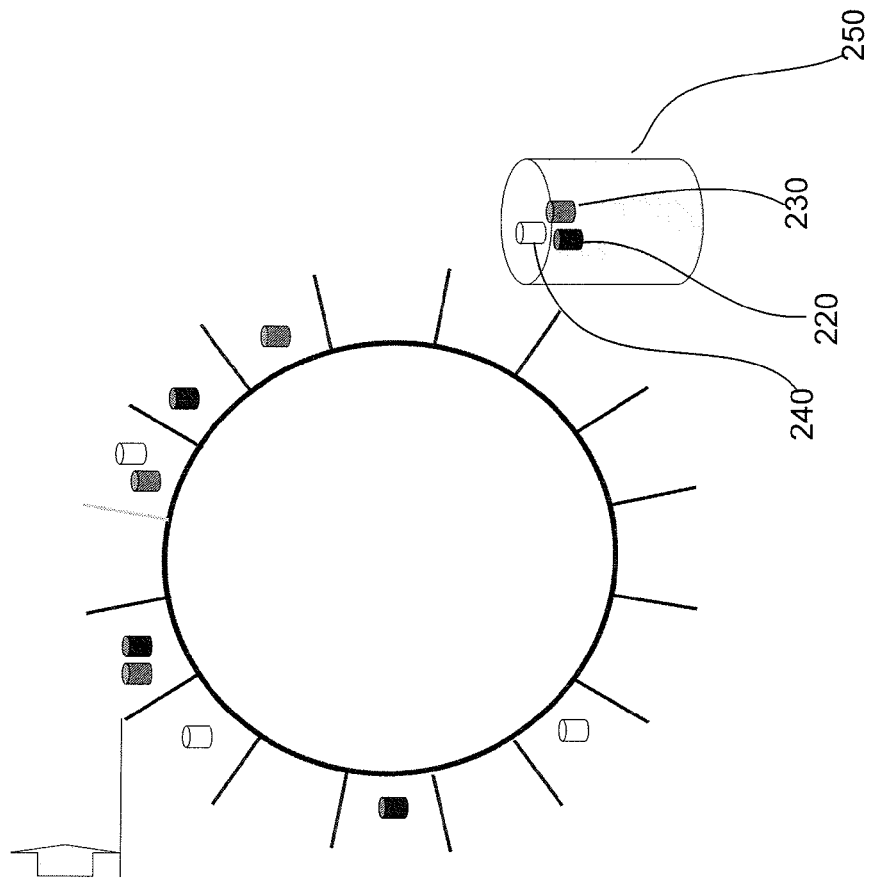

FIG. 2c shows how events are being put in the pipe which indicates that packets are sent. The three events 220, 230, 240 from FIG. 2b cog 214 has fallen down in the box 250 for sending of packets.

FIG. 2d shows that the calendar wheel continues to rotate.

The number of cogs in the calendar wheel corresponds to the largest time that an event can be put on schedule in advance.

In practice, a calendar wheel may be implemented as a circular memory array which is a memory array whose first element is thought of as being subsequent to the last element. Each element holds the head of a linked list of events. Hence, each element of the array can be thought of as one cog.

A program is holding the index of the current cog. A hardware timer can be used to get a hardware interrupt once each interval. With the example given in the beginning we stipulated a needed precision of 0.5 ms. Hence, there would be a hardware interrupt each 0.5 ms. The program is invoked by the interrupt, steps the index and traverses the list of events.

A calendar wheel has two important features that make it specially suited to scheduling frames and packet for video streams. One is that the time to put an event on schedule is constant and not depending on the size of the calendar wheel or the number of events put on schedule. Another is that the time to schedule an event is constant if there is not a strict ordering on events in the same cog.

Streaming thousands of video streams with shaping means that there are in the order of 10 000 events scheduled. Hence, both features are of outmost importance in high performance video streaming. The current invention stipulates the calendar wheel method to be used as a basis for timely scheduling frames and packets in video streams. The novel features will be described with more details below.

Figure 3:
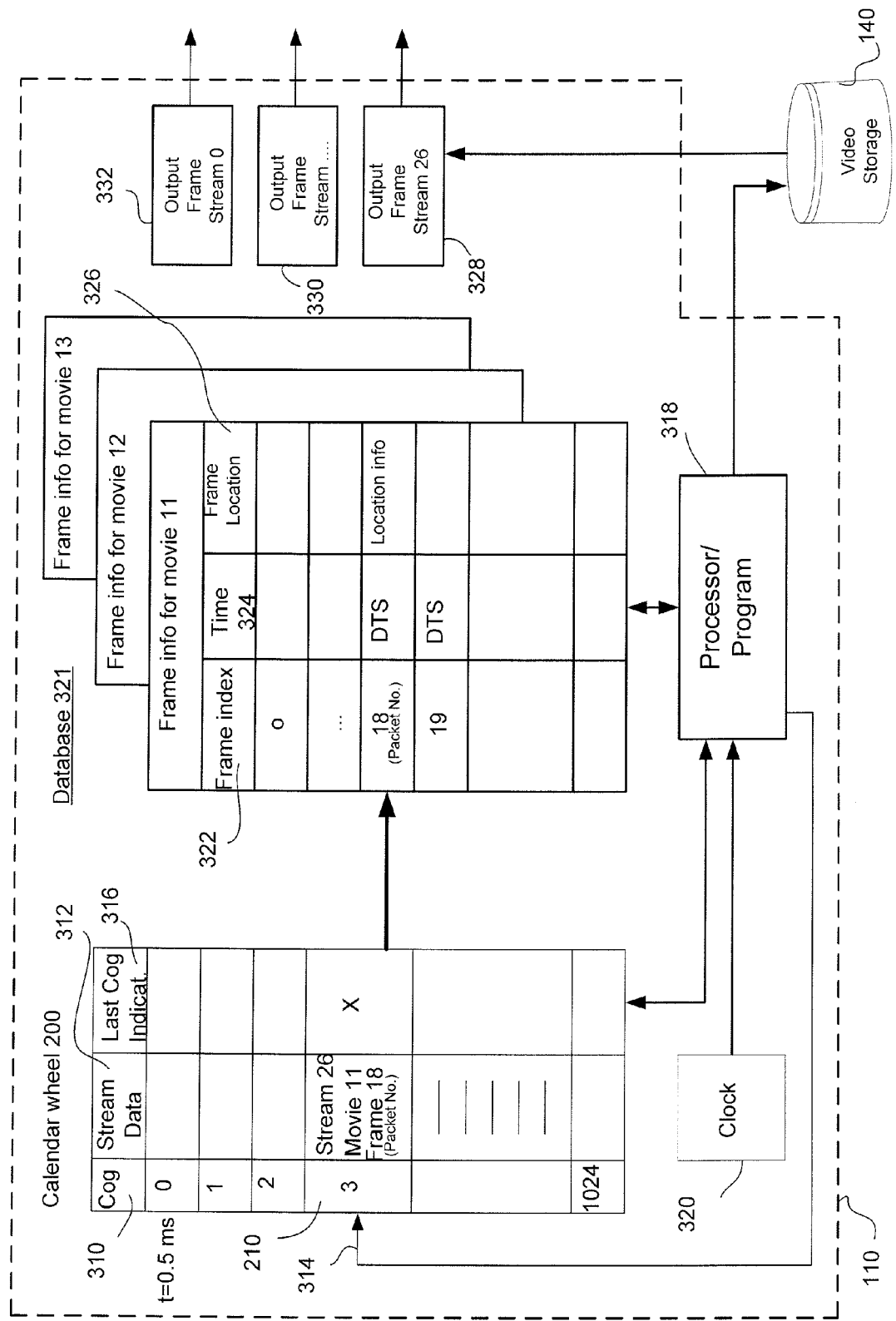
FIG. 3 shows a block diagram of a video streaming server according to the invention.

FIG. 3 shows the VoD Streaming Server 110 according to an embodiment of the invention for timely delivering of frames/packets in a movie to a client. One important part of the Streaming Server is the earlier mentioned Calendar Wheel or memory array 200 implemented as a circular array. The Calendar Wheel has a number of Cogs or elements 310 which in this example is 1024. For each Cog/element there is an information area 312 able to keep Stream Data for sending of a frame or packet. Stream Data includes the following information: Stream number, for instance Stream 26, Movie Identity, for instance Movie 11 and also information on Frame number, in this example Frame 18. Optionally a packet number or packet identity may be included (Packet no.) The Stream Data information which in this example is temporarily stored in Cog number 3 includes the information on what Stream to send out Frame 18 of Movie 11. If there is no Stream Data in the information area 312 for a Cog no frame is to be sent to a client during this Cog time period.

A movie is just an example of the streamed media which can be any type of media other than a movie. Movie 11 is thus an example of a media identity.

Each Cog represents a defined time period which in this example is 0.5 ms for a packet. A pointer 314 steps through all Cogs in the Calendar Wheel and moves one Cog every 0.5 ms. When it reaches Cog number 3 the information in the Stream Data field is fetched for the purpose of delivering the frame to a client. The pointer 314 is implemented as a program/processor 318 holding the index of the current cog. A hardware timer or clock 320 is controlling the processor 318 to secure that the calendar wheel rotates at the constant speed selected—in this example 0.5 ms per Cog. The processor 318 is controlling the reading of the stream data from the Calendar Wheel 200.

The Calendar Wheel 200 in FIG. 3 also includes an indication area 316 for each Cog where an indication is kept as information for a plurality cog scheduling procedure.

Thus to summarize, the Calendar Wheel or memory array 200 holds the information about the frames or packets that should be sent towards the subscribers having STBs. In this example each cog or element represents 0.5 ms and the calendar wheel holds information about 1024 cogs/elements. This means that the whole wheel is handled in about 0.5 s=1024*0.5 ms. Each cog has a list of the streams that need to send a frame/packet during this cog. Some cogs don't need to send any frame and other cogs might send several frames/packets. Each entry in the cog has information about the stream this output belongs to and the movie and frame in movie that should be sent. A cog represents a small time period when an event can be scheduled. A stream represents a stream towards a STB.

In the Video on Demand Streaming Server according to the invention there is a database 321 including Frame information for media which in the example is a movie. For each movie there is an identification number for the movie and the database is built with information sorted for each movie. For instance in our example the information in the Cog tells that Frame 18 in Movie 11 is to be transmitted to a client on Stream 26.

The database 321 includes for each movie a frame index column 322 with information on all frames in a movie and the ordering the frames should be sent for decoding. Also the database includes a time column 324 with DTS information (Decode Time Stamp) which is the time when a frame should be sent to the STB for decoding. DTS is just an example, the time can be described in other ways. This information is used for scheduling which will be described below. In a third column 326 there is information about Frame Location which means information on where the Frame is stored in the Video Storage 140. Thus as described earlier the processor 318 is controlling the reading of the stream data from the Calendar Wheel 200 and the processor is upon the reading of the stream data controlling the fetching of the Frame (in the stream data) from the Media Storage by use of the Location information in the Database 321.

As an alternative it would be possible to have the database 321 built up in a different way so that the basic indication is the stream instead of the movie.

The VoD Streaming Server 110 further includes an output storage 328, 330, 332 where the frame to be sent on the stream is put previous to sending or transmitting. The frame 18 in movie 11 is fetched from its location in the Video Storage 140 and delivered to the Output 328, from where it is being transmitted to the STB of the client on stream 26.

Figure 4:
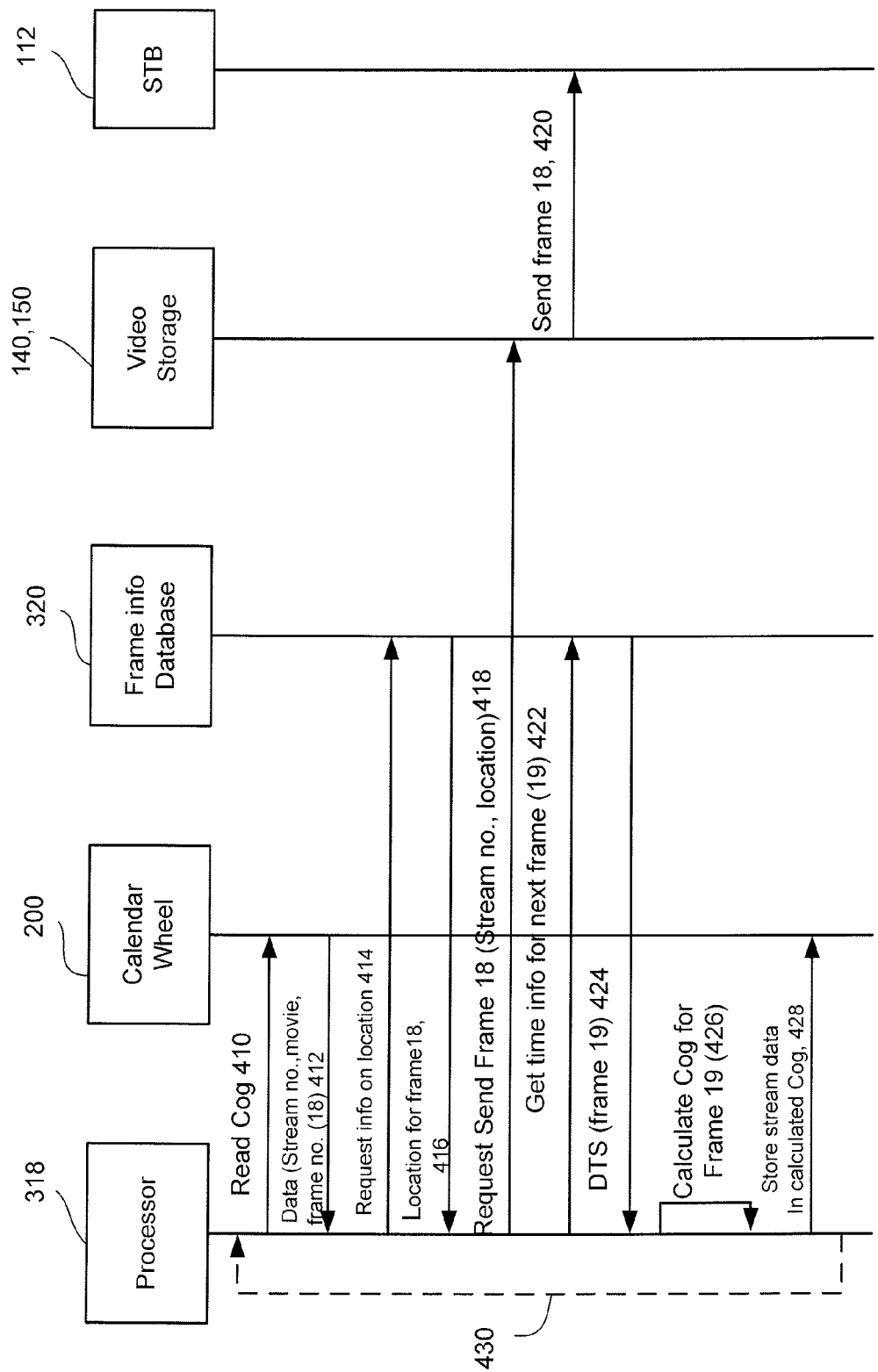
FIG. 4 is a sequence diagram illustrating signals in the communications system according to the invention.

In FIG. 4 a sequence diagram illustrates signals in the communications system described in FIGS. 1, 2 and 3. This is the basic flow which starts with the processor 318 sends a Read Cog message 410 to the Calendar wheel 200. According to the previous description the Processor is keeping track of which Cog to read. Stream Data from the Cog is being fetched, step 412. For example this may be the Stream Data in Cog 3 earlier described, Stream no. 26, movie no. 11 and frame 18. As earlier mentioned also a Packet No. may be indicated. The processor 318 then sends a request 414 to the Database 320 for frame info for movie 11 regarding location. In return the Database sends information, step 416 on the location for frame 18 in movie 11. The location is in this example an address in the Video Storage 140. Further, the Processor 318 submits a request step 418 to the Video Storage 140 to send frame 18 to the STB. The request includes the location information for the frame. Upon reception of the Send Request in step 418 the frame 18 is sent, step 420, from the Video Storage to the STB 112 preferably in the way described earlier. Optionally it may not be the complete frame but a packet in the frame, the packet being indicated by the earlier mentioned Packet No.

When the frame/packet has been sent or possibly several frames in one cog has been sent there is a procedure for scheduling the next frame. In the case of several frames being sent it means that the frames belong to different movies. In the FIG. 4 this procedure initiates when the processor 318 communicates with the Database 320 to Get, in step 422, the time information for the next frame, which in the example is frame 19 (see FIG. 3) from the time column 324. The processor 318 receives the DTS information for frame 19 of movie 11 in a message 424. Upon the reception of the message in step 424, the processor calculates, in step 426 a Cog for frame 19, the next frame, to be sent to the STB. Then the Stream Data for frame 19 is stored in the calculated Cog in the Calendar Wheel 200, step 428. The dotted arrow 430 indicates that the process starts again from reading a cog 410.

This FIG. 4 describes briefly the method and the interaction among the entities in the system for this invention. In the FIGS. 5a, b and c. The method is further described together with an alternative embodiment for the scheduling of Cog/s.

Figure 5A:
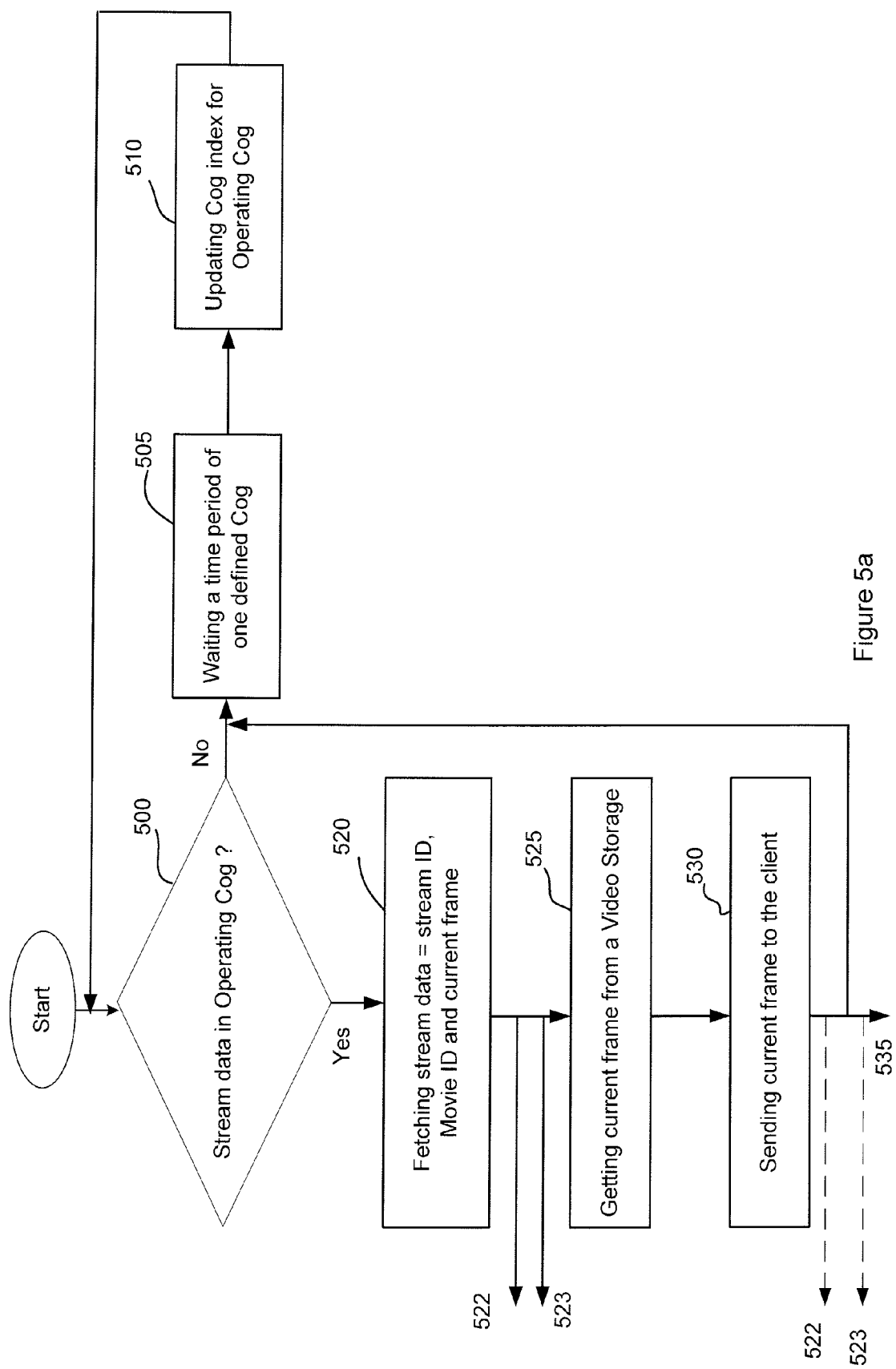
FIGS. 5a, 5b and 5c are flow diagrams illustrating operational steps carried out in the Streaming Server.

The method according to the flow diagram in FIG. 5a starts with step 500 where the processor 318 via the pointer 314 (see FIG. 3) determines if there is stream data in an Operating Cog. The Operating Cog is the cog where the pointer is at the current moment. As earlier described the Cog represents a defined Cog time period. According to the example in FIG. 3 the pointer 314 is put to cog number 3 carrying stream data. Since there is stream data in the cog number 3 the processor 318 fetches the stream data i.e. Stream 26, Movie 11 and Frame 18. This is in the figure done in step 520.

If there is no stream data in the cog, if the cog for example would have been cog number 2 in FIG. 3 then instead the next step would have been step 505, Waiting a time period of one defined Cog and the step 510 including Updating Cog index for the Operating cog which means that now the Operating Cog is Cog number 3 and the procedure/method again starts with step 500 determining if there is stream data in the operating cog.

After step 520 in which stream data is being fetched to the processor 318 the next step 525 is to get the current frame, which in the example is frame 18 of movie 11, from a Video Storage. To do this step the stream information related to movie and current frame is used. The getting step includes Determining from the Database 321 where the current frame is located and fetching the current frame from the location and storing the current frame in an output memory 328.

The last step in the method of timely delivering of frames to a client is the step 530 of sending the current frame to the client. Then step 505 and 510 is being performed before the method starts again with the determining step 500.

Said fetching step 520 is followed by removing of the stream data in the Operating Cog. After the removing of stream data new stream data can be entered in the Calendar wheel.

Also the method includes scheduling of frames to be delivered. There are two scheduling embodiments 522 and 523 which can be done either directly after the fetching step 520 or after the sending step 530 as indicated with dotted lines in the FIG. 5a.

The first scheduling embodiment 522 is a single Cog scheduling procedure which includes the step 540 Calculating a scheduled Cog for the next frame=current frame+1, this is in the example of FIG. 3 to schedule for frame 19 of movie 11. The calculating step is done by fetching time information DTS for the next frame in the Frame Info table 320. This time information is used together with the defined Cog time period in the calendar wheel to calculate a scheduled Cog in which the stream information for the next frame is to be inserted.

The processor 318 is doing the calculations according to an algorithm which for instance may be $$\{DTS(\text{frame }19) - DTS(\text{frame }18)\}/\text{Defined Cog time period} = \text{number of Cogs}$$

This means that the entering of stream data is to be done in the result−number of Cogs−ahead of the current cog. If current cog is number 3 and number of cogs is calculated to 700, then the stream data for frame 19 is to be entered in cog number 703.

An alternative embodiment is a plurality cog scheduling procedure 523. In this procedure it is initially determined if the Operating Cog, for instance Cog number 3, includes a method of determining if there is a last cog indication meaning that a plurality cog scheduling procedure is required. This may be a simple mark, x in FIG. 3, telling that a new plurality cog scheduling should be done.

If there is a mark (X) as exemplified in FIG. 3 then a plurality cog scheduling procedure 523 is to be done. The method is similar to single cog scheduling procedure but the difference is that several cogs, for instance 10, are calculated at the same time resulting in the step 560 of entering stream data in the 10 scheduled cogs and finally entering, in step 565, in the last scheduled Cog an indication that this is the last Cog keeping stream data information and a new scheduling has to be made. Thus in this plurality cog scheduling procedure the scheduling is not done for each frame being sent out. Instead several frames are scheduled at the same time.

Figures 5B, 5C:
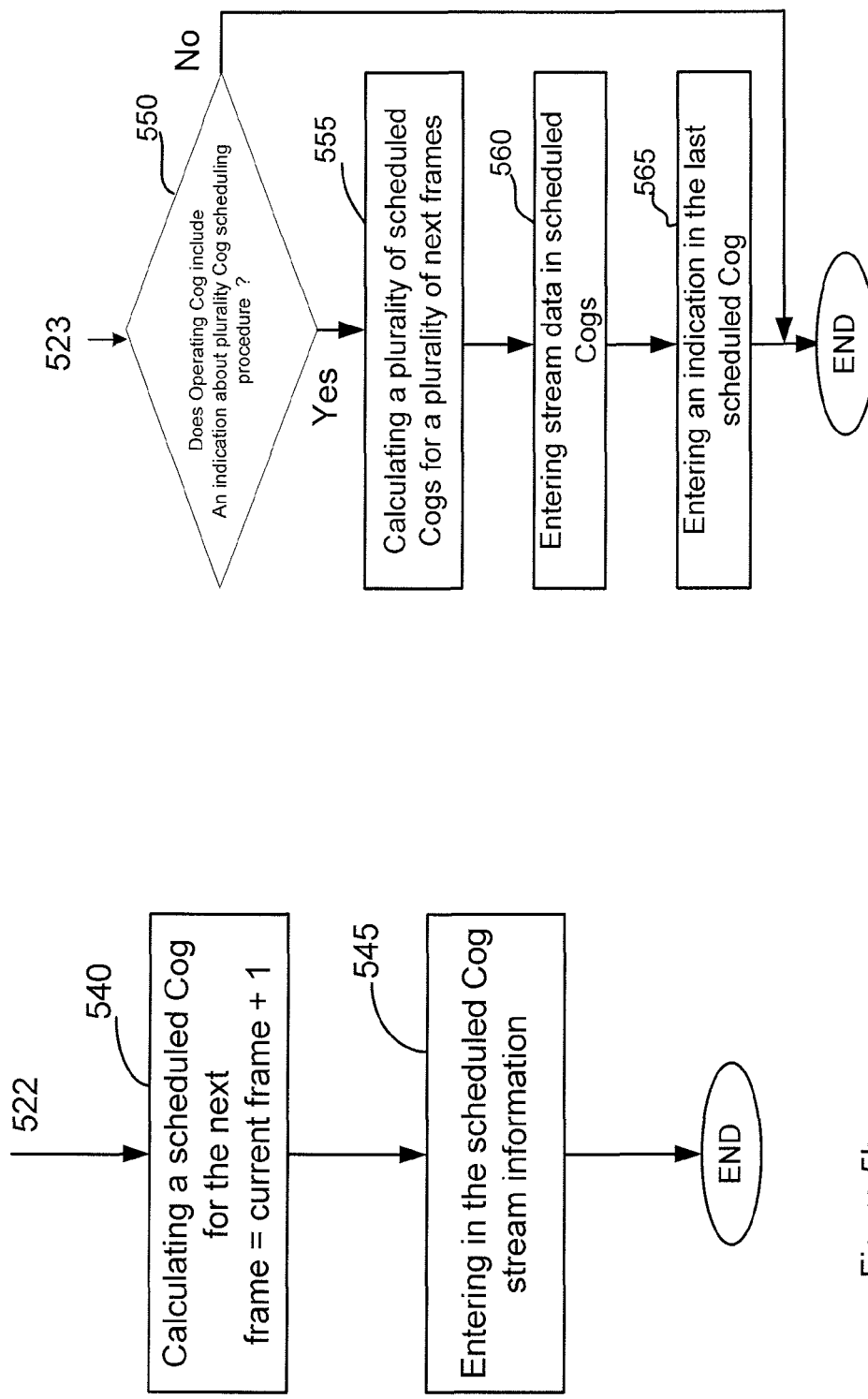

The invention also includes a computer program product for streaming media objects from a Streaming Server to a client, the computer program product, when executed on a computer, performing the method described in the FIG. 5.

According to the invention the frame scheduling is done in a very efficient way which enables packet scheduling or shaping with respect to subscriber line SLAs since the invention makes it possible to keep control of the bandwidth.

The invention claimed is:

1. A method in a streaming server for delivering of frames to a client, said method comprising the steps of:
    determining if there is stream data in an operating element of a memory array, comprising elements, each representing a defined time period;
    fetching stream data, including information on stream number, media identity and current frame number, from the operating element;
    determining from a Frame Index Table a media storage where the current frame is located;
    fetching the current frame from the media storage and storing the current frame in an output memory;
    sending the current frame to the client on the stream in the fetched stream data; fetching time information for the next frame in the Frame Index Table, wherein the time information comprises Decode Time Stamp (DTS) information related to particular content being streamed, wherein the Frame Index Table includes frame information for multiple movies to be streamed; and
    scheduling the next frame by calculating the position of an element of the memory array using said fetched time information together with the defined time period, and inserting stream data for the next frame in the calculated element of the memory.

2. The method according to claim 1, further comprising the following steps:
    waiting the defined time period and
    updating element index for operating element=operating element+1.

3. The method according to claim 1, further comprising a single element scheduling procedure comprising the steps of:
    calculating a scheduled element for the next frame and
    entering in the scheduled element information on stream number, media identity and next frame number.

4. The method according to claim 1, further comprising a plurality element scheduling procedure comprising the steps of:
    calculating a plurality of scheduled elements for a plurality of next frames;
    entering information on stream data in the scheduled elements and
    entering in the last scheduled element an indication that this is the last element, keeping stream data information and a new scheduling has to be made.

5. The method according to claim 4, wherein the plurality element scheduling procedure starts with the step of:
    determining from information in the operating element if a new plurality element scheduling should be done.

6. The method according to claim 1, wherein a frame is built up of a sequence of packets.

7. A streaming server for delivering of frames from a media storage to clients, the streaming server including:
    a calendar wheel comprising cogs representing a defined time period which cogs carry stream data information if a Frame/Packet is to be delivered to a client during the time period;
    a Frame Index Table with Frame/Packet Information for media to be delivered to clients, the Frame Information including Location Information for
    Frames/Packets, and time information of the time when the Frame is to be delivered to the client, wherein the time information comprises Decode Time Stamp (DTS) information related to particular content being streamed, and wherein the Frame Index Table includes frame information for multiple movies to be streamed;
    a Processor for controlling fetching/reading of Stream Data from the calendar wheel and controlling the fetching of the Frame/Packet from the media storage by use of the Location Information for Frames/Packets, the processor further using the time information for the next frame to calculate the position of a cog for scheduling of the next frame;
    an Output connected with the Stream for delivery of the Frame/Packet to the client.

8. The Streaming Server according to claim 7, wherein the Stream Data Information comprises information on Stream number, Media Identity and Frame number.

9. The Streaming Server according to claim 7, wherein the Calendar Wheel includes Last Cog Indication information.

10. The Streaming Server according to claim 7, wherein the streaming server is a Video on Demand Streaming Server, and the media relates to an identified movie.

11. The Streaming Server according to claim 7 wherein the calendar wheel is a memory array and a cog is an element in the array.

* * * * *